US009961295B2

(12) United States Patent
Takada

(10) Patent No.: US 9,961,295 B2
(45) Date of Patent: May 1, 2018

(54) DISPLAY DEVICE

(75) Inventor: Naoki Takada, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days. days.

(21) Appl. No.: 14/407,045

(22) PCT Filed: Jun. 22, 2012

(86) PCT No.: PCT/JP2012/066002
§ 371 (c)(1),
(2), (4) Date: Dec. 10, 2014

(87) PCT Pub. No.: WO2013/190695
PCT Pub. Date: Dec. 27, 2013

(65) Prior Publication Data
US 2015/0172594 A1    Jun. 18, 2015

(51) Int. Cl.
*H04N 5/775* (2006.01)
*H04N 9/80* (2006.01)
(Continued)

(52) U.S. Cl.
CPC ........... *H04N 5/775* (2013.01); *G06F 3/1446* (2013.01); *G06Q 30/0272* (2013.01); *G11B 27/34* (2013.01); *H04N 5/765* (2013.01); *H04N 9/30* (2013.01); *H04N 9/87* (2013.01); *H04N 21/4122* (2013.01); *H04N 21/41415* (2013.01); *H04N 21/4325* (2013.01); *H04N 21/440263* (2013.01); *H04N 21/812* (2013.01); *G09G 3/3406* (2013.01); *G09G 2300/026* (2013.01); *G09G 2340/045* (2013.01); *H04N 5/64* (2013.01)

(58) Field of Classification Search
USPC ................................................ 386/230, 248
See application file for complete search history.

(56) References Cited

U.S. PATENT DOCUMENTS 8,988,313 B2 * 3/2015 Takishita .............. G06F 3/1446
345/1.3
2006/0164326 A1 * 7/2006 Date ..................... G06F 3/1446
345/1.3
(Continued)

FOREIGN PATENT DOCUMENTS

CN         1296240 A      5/2001
CN       101087433 A     12/2007
(Continued)

OTHER PUBLICATIONS

International Search Report in [PCT/JP2012/066002] dated [Jul. 17, 2012] (English Translation Thereof).
(Continued)

*Primary Examiner* — Nigar Chowdhury
(74) *Attorney, Agent, or Firm* — McGinn IP Law Group, PLLC.

(57) ABSTRACT

A display device includes: a display panel that displays an input video signal; and a video recording and reproduction unit that records and reproduces a video picture to be displayed on the display panel. The video recording and reproduction unit includes an image-size setting unit that reduces a size of a screen of the input video signal according to a multi-display configuration.

22 Claims, 6 Drawing Sheets

(51) Int. Cl.
*G06F 3/14* (2006.01)
*H04N 5/765* (2006.01)
*H04N 9/87* (2006.01)
*H04N 21/41* (2011.01)
*H04N 21/414* (2011.01)
*H04N 21/432* (2011.01)
*H04N 21/4402* (2011.01)
*H04N 21/81* (2011.01)
*G06Q 30/02* (2012.01)
*G11B 27/34* (2006.01)
*H04N 9/30* (2006.01)
*G09G 3/34* (2006.01)
*H04N 5/64* (2006.01)

(56) References Cited

U.S. PATENT DOCUMENTS

| | | | | |
|---|---|---|---|---|
| 2007/0091204 | A1* | 4/2007 | Koshimizu | G09G 5/36 348/441 |
| 2007/0285342 | A1* | 12/2007 | Morikawa | G06F 3/1446 345/1.3 |
| 2008/0211825 | A1* | 9/2008 | Sunakawa | G06F 3/1446 345/581 |
| 2008/0309811 | A1* | 12/2008 | Fujinawa | G02F 1/1347 348/333.01 |
| 2009/0121655 | A1* | 5/2009 | Kojima | G09G 3/3406 315/307 |
| 2009/0225506 | A1* | 9/2009 | Lee | H05K 5/0017 361/679.21 |
| 2010/0001925 | A1* | 1/2010 | Kim | G06F 3/1446 345/1.3 |
| 2010/0034514 | A1* | 2/2010 | Massart | H04N 5/775 386/200 |
| 2010/0238090 | A1* | 9/2010 | Pomerantz | G02F 1/13336 345/1.3 |
| 2012/0042102 | A1* | 2/2012 | Chung | H04M 1/7253 710/33 |
| 2012/0050314 | A1* | 3/2012 | Wang | G06F 3/1446 345/619 |
| 2012/0056902 | A1* | 3/2012 | Yoshino | G09G 3/20 345/660 |
| 2012/0086862 | A1* | 4/2012 | Gohshi | H04N 5/913 348/687 |
| 2012/0105424 | A1* | 5/2012 | Lee | G09F 9/35 345/212 |
| 2013/0077937 | A1* | 3/2013 | Kennedy | H04N 21/4122 386/241 |
| 2016/0103476 | A1* | 4/2016 | Kim | G06F 3/038 345/1.3 |

FOREIGN PATENT DOCUMENTS

| | | |
|---|---|---|
| CN | 101620846 A | 1/2010 |
| CN | 102446079 A | 5/2012 |
| JP | 09-182016 A | 7/1997 |
| JP | 11-327522 A | 11/1999 |
| JP | 2000-278625 A | 10/2000 |
| JP | 2006-211164 A | 8/2006 |
| JP | 2008-116874 A | 5/2008 |
| JP | 2011-149987 A | 8/2011 |
| JP | 2012-124759 A | 6/2012 |

OTHER PUBLICATIONS

Japanese Office Action in Japanese Application No. 2014-521180 dated Aug. 4, 2015 with a partial English translation.
Chinese Office Action in Chinese Application No. 201280074074.9 dated May 5, 2016 with an English translation.
Chinese Office Action dated May 5, 2016 with an English translation.

* cited by examiner

FIG. 5
(A) 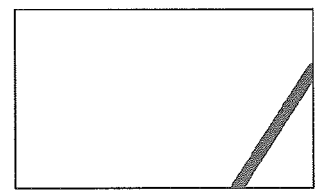
POSITION INFORMATION: UPPER LEFT
(B) 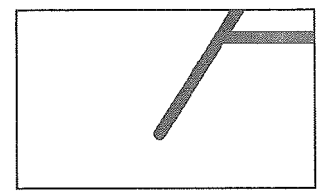
POSITION INFORMATION: LOWER LEFT
(C) 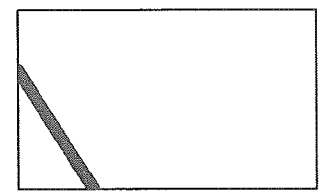
POSITION INFORMATION: UPPER RIGHT
(D) 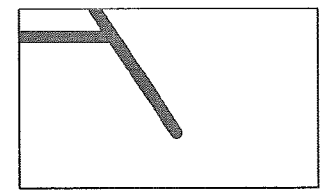
POSITION INFORMATION: LOWER RIGHT
(E) 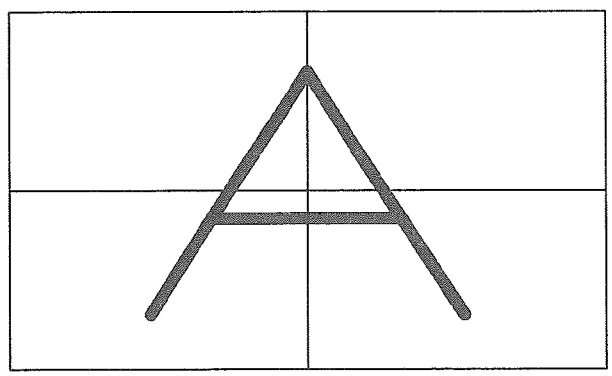

DISPLAY DEVICE

TECHNICAL FIELD

The present invention relates to a display device used in a digital signage system.

BACKGROUND ART

A digital signage system in which a display is arranged in a station or an airport, on a wall surface of a building, outside the front of a store in a shopping area, or the like, so as to display advertising contents on the display has been known (for example, Patent Document 1). In such a digital signage system, advertising contents from a content server are transmitted to the display via a network, and the advertising contents can be changed over according to a schedule and displayed. Accordingly, various video advertisements can be offered. Moreover, as the display to be used in the digital signage system, a display having a multi-display configuration in which a plurality of displays are two-dimensionally arranged in a matrix, and video pictures are displayed by using these displays as one large display can be used.

PRIOR ART DOCUMENTS

Patent Document

[Patent Document 1] Japanese Unexamined Patent Application, First Publication No. 2011-149987

SUMMARY OF THE INVENTION

Problem to be Solved by the Invention

As described above, in the digital signage system, advertising contents from the content server are transmitted to the display via the network, and the advertising contents can be changed over according to the schedule and displayed. However, in the digital signage system, it is difficult to confirm whether the advertising contents have been displayed on the display according to the schedule.

That is to say, in the digital signage system, by analyzing logs of the content server, it can be determined whether the advertising contents have been created according to the schedule. However, while from the log analysis on the content server side, it can be confirmed that the advertising contents have been transmitted from the content server to the display, it is difficult to confirm whether the advertising contents have been displayed on the display. For example, even if the advertising contents are transmitted from the content server to the display according to the schedule, the advertising contents may not be received on the display side due to some trouble on the network. Moreover, even if the advertising contents are transmitted from the content server to the display according to the schedule, input setting of the display may not be performed correctly, and hence, the advertising contents may not be displayed on the display.

Furthermore, it can be considered to install a video camera near a site where the display is arranged, and film the video pictures displayed on the display with the video camera and record the video pictures. If the video pictures displayed on the display are filmed by the video camera and recorded, it can be confirmed whether the advertising contents have been displayed on the display according to the schedule. However, if a video camera is installed near the site where the display is arranged, additional costs relating to the equipment arise, and maintenance and management of the installed video camera are required.

In view of the above problem, the present invention has an exemplary object to provide a display device that can confirm actual display performance of the advertisement.

Means for Solving the Problem

In order to solve the above problem, a display device according to the present invention includes: a display panel that displays an input video signal; and a video recording and reproduction unit that records and reproduces a video picture to be displayed on the display panel, and the video recording and reproduction unit includes an image-size setting unit that reduces a size of a screen of the input video signal according to a multi-display configuration.

Effect of the Invention

According to the present invention, a video recording and reproduction unit is included in a display device constituting the digital signage system. In the case of a multi-display configuration in which a plurality of display devices form one large screen, a video screen to be recorded in the video recording and reproduction unit of each display device is recorded with the size being reduced according to the number of displays to be used for multi-display. Together with this, position information relating to arrangement positions of the respective display devices in the multi-display, and a time code for synchronizing the respective displays, are recorded in the video recording and reproduction unit. As a result, large-screen video pictures formed by the multi-display configuration can be displayed on one display device, and it can be confirmed whether the advertising contents have been displayed according to the schedule.

BRIEF DESCRIPTION OF THE DRAWINGS

FIG. 5 is an explanatory diagram for when confirmation of actual display performance is performed by using a signal recorded in the video recording and reproduction unit.

EMBODIMENTS FOR CARRYING OUT THE INVENTION

Figure 1:
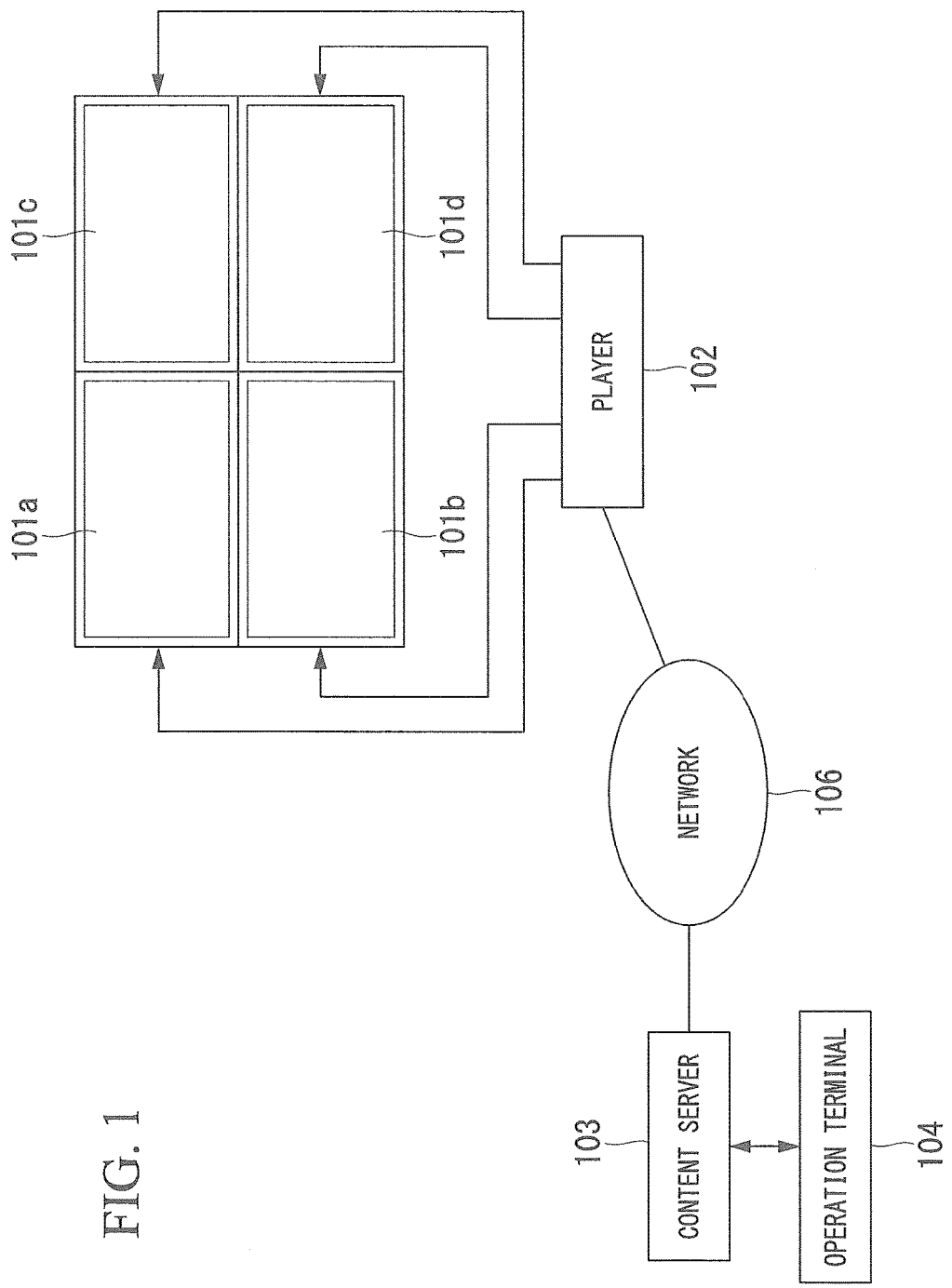
FIG. 1 is a block diagram showing an example of a digital signage system according to a first exemplary embodiment of the present invention.

Hereunder, exemplary embodiments of the present invention will be described with reference to the drawings. FIG. 1 shows an example of a digital signage system according to a first exemplary embodiment of the present invention. As shown in FIG. 1, the digital signage system is configured from a plurality of display devices 101a to 101d, a player 102, a content server 103, and an operation terminal 104.

The display devices 101a to 101d are arranged in a station or an airport, on a wall surface of a building, outside the front of a store in a shopping area, or the like. Here, four display devices 101a to 101 d are arranged side by side in a two-dimensional array, to form a multi-display configuration. The player 102 supplies a video signal to the respective display devices 101a to 101d so as to form one large screen by multi-display including these four display devices 101a to 101d.

The content server 103 is arranged at a position away from the display devices 101a to 101d. A large amount of advertising contents is accumulated in the content server 103. Furthermore the operation terminal 104 is provided with respect to the content server 103. The content server 103 and the player 102 are connected to each other via a network 106.

In such a system, an operator operates the operation terminal 104 to decide a time to display the advertisement and the advertising contents to be displayed, and registers a schedule in the content server 103. The advertising contents are read from the content server 103 based on the registered schedule, and the advertising contents are transmitted to the player 102 via the network 106. The player 102 reproduces the received advertising contents and supplies video signals of the advertising contents to the display devices 101a to 101d.

As a result, video pictures based on the advertising contents are displayed on the display devices 101a to 101d.

Figure 2:
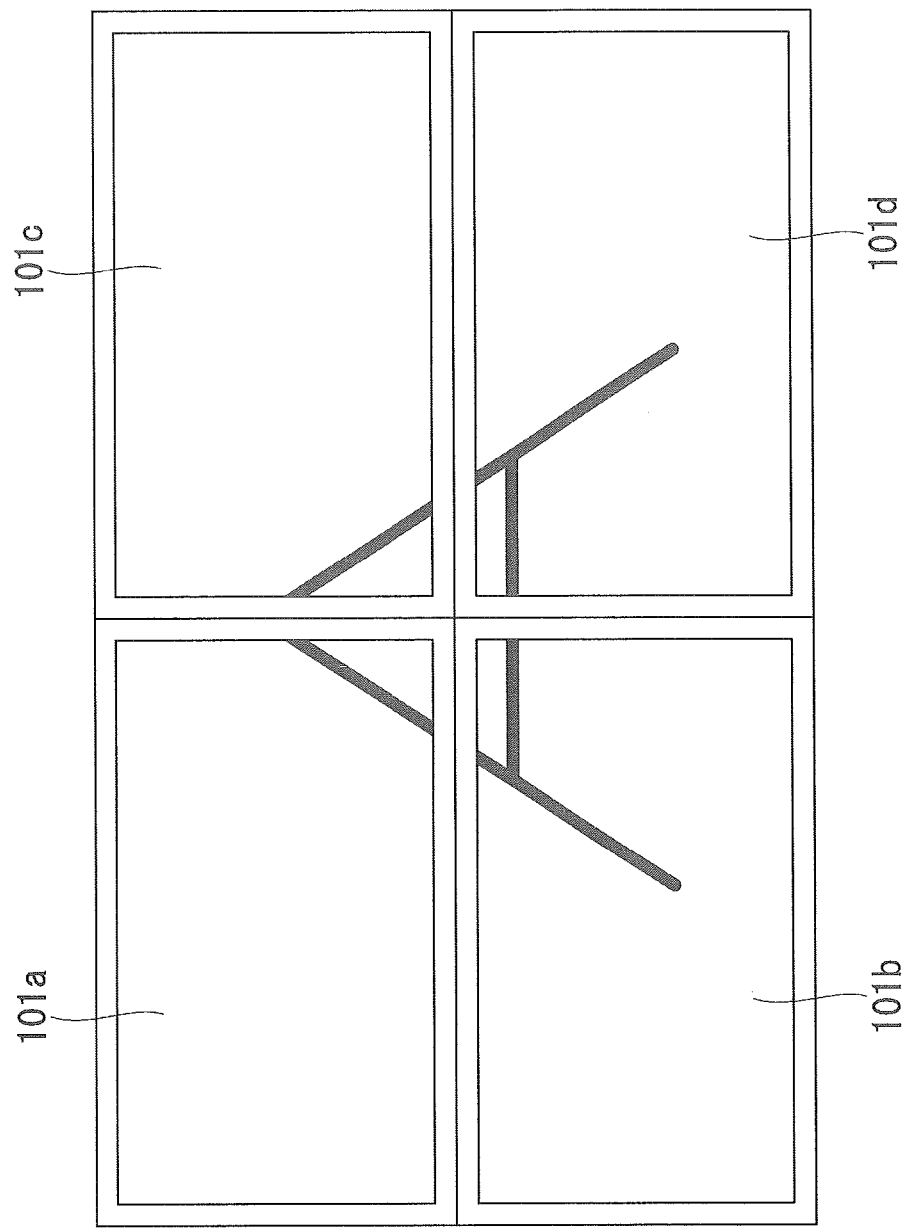
FIG. 2 is an explanatory diagram of a multi-display display screen.

For example, it is assumed that a schedule is registered in the content server 103 so as to display advertising contents including the character "A". In this case, advertising contents including the character "A" are transmitted from the content server 103 to the player 102 via the network 106. Upon reception of the advertising contents, the player 102 supplies a video signal to the respective display devices 101a to 101d so that the video picture contents including the character "A" are displayed on one large screen by multi-display formed by the four display devices 101a to 101d. As a result, as shown in FIG. 2, the video picture contents including the character "A" are displayed on the multi-display including the four display devices 101a to 101d.

Figure 3:
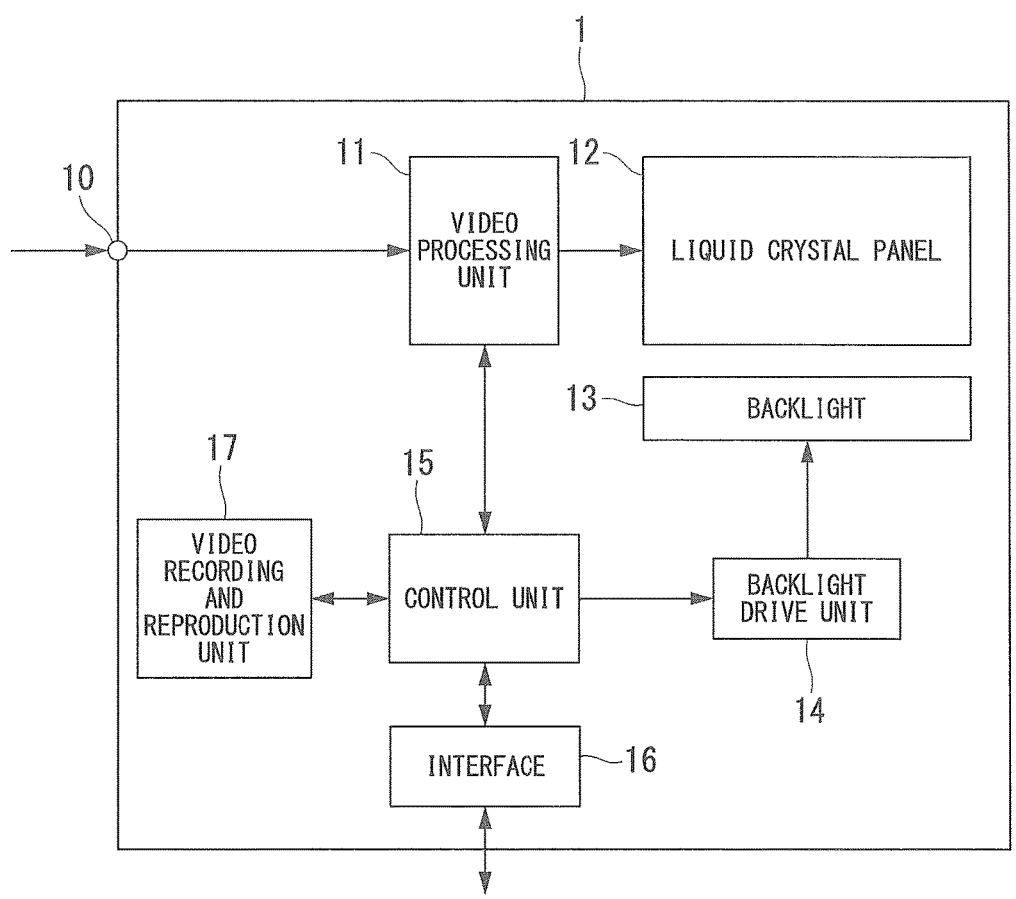
FIG. 3 is a block diagram showing an example of a display device according to the first exemplary embodiment of the present invention.

Next is a description of a display device according to the first exemplary embodiment of the present invention. FIG. 3 is a block diagram showing a configuration of a display device 1 according to the first exemplary embodiment of the present invention. The display device 1 can be used as the display devices 101a to 101d in the digital signage system in FIG. 1.

As shown in FIG. 3, the display device 1 according to the present exemplary embodiment includes a video processing unit 11, a liquid crystal panel 12, a backlight 13, a backlight drive unit 14, a control unit 15, an interface 16, and a video recording and reproduction unit 17.

In FIG. 3, a video signal input from an input terminal 10 is supplied to the video processing unit 11. The video processing unit 11 performs image size adjustment, luminance correction processing (sharpness, brightness, contrast, and the like), color correction processing, and the like, with respect to the input video signal. An output signal of the video processing unit 11 is supplied to the liquid crystal panel 12.

The liquid crystal panel 12 is configured, for example, by enclosing a liquid crystal layer including a liquid crystal composition between an array substrate on which a TFT (Thin Film Transistor) or the like is arranged in each pixel, and a color filter substrate. On the color filter substrate, for example, color filters of three primary colors of red (R), green (G), and blue (B) are respectively arranged.

The backlight 13 serves as a light source that irradiates light to the liquid crystal panel 12. As the backlight 13, an LED (Light Emitting Diode) or a cold cathode-ray tube is used. The backlight 13 is driven by a drive signal from the backlight drive unit 14.

The control unit 15 controls an entire operation of the display device 1. The control unit 15 can transfer a signal to and from an external device via an interface 16.

The video recording and reproduction unit 17 receives a video signal to be displayed on the liquid crystal panel 12 from the video processing unit 11 via the control unit 15, and records the video signal. At this time, the video recording and reproduction unit 17 reduces the size of the screen according to the number of displays to be used for multi-display, and records the position information relating to the arrangement positions of the respective display devices in multi-display, and the time code for synchronizing the respective displays. Furthermore the video recording and reproduction unit 17 may record an operating state of the backlight 13 simultaneously. Moreover, the video recording and reproduction unit 17 can reproduce the recorded video signal and output the video signal to the outside via the interface 16.

Figure 4:
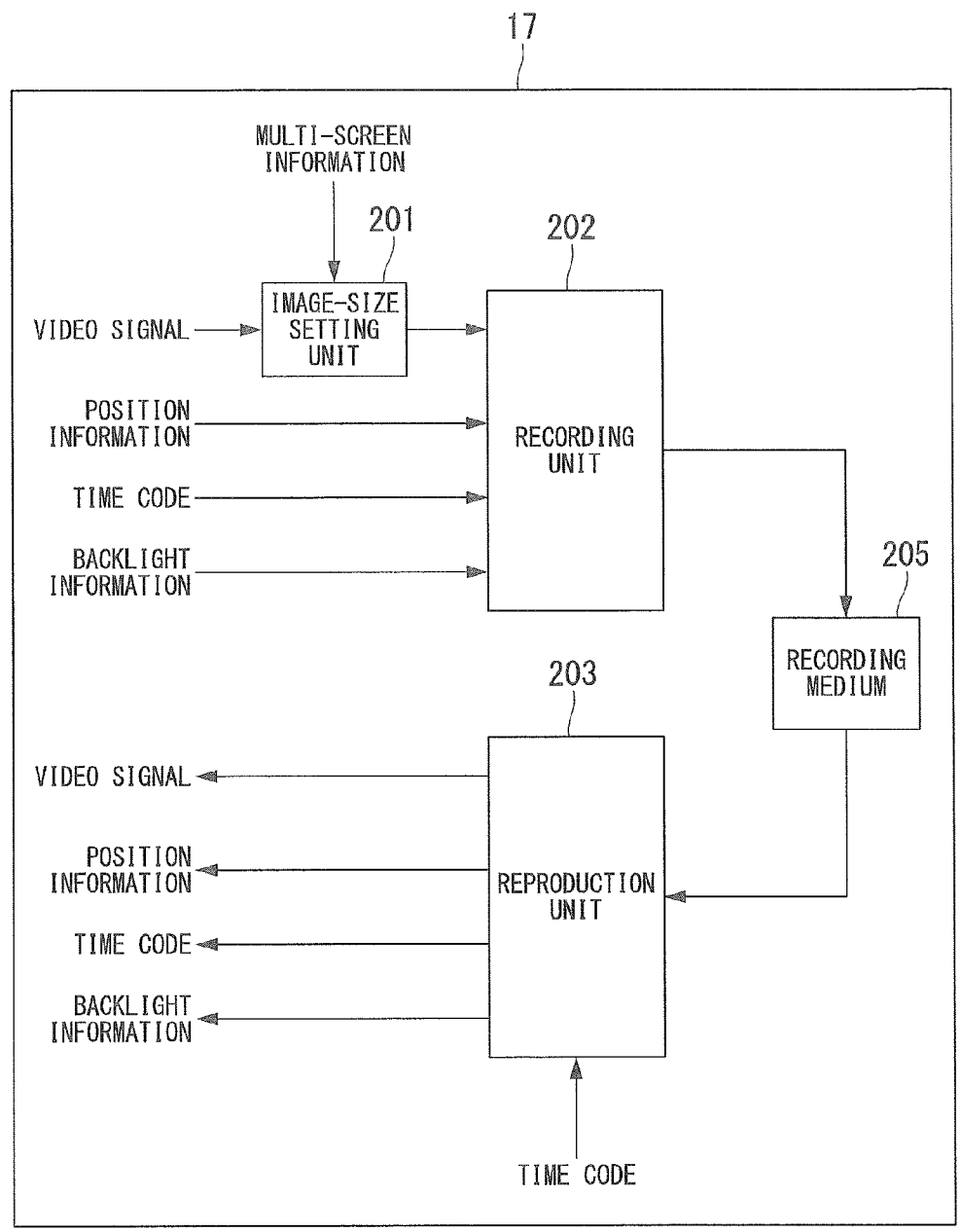
FIG. 4 is a block diagram showing an example of a video recording and reproduction unit in the display device according to the first exemplary embodiment of the present invention.

FIG. 4 shows an example of the video recording and reproduction unit 17. As shown in FIG. 4, the video recording and reproduction unit 17 includes an image-size setting unit 201, a recording unit 202, and a reproduction unit 203. The video recording and reproduction unit 17 can reduce the size of the screen according to the number of displays to be used for multi-display and record the screen, when a plurality of display devices form one large screen.

The image-size setting unit 201 reduces the size of the screen according to the number information of the displays to be used for multi-display (multi-screen information). That is to say, in the case of multi-display in a two-dimensional array with M displays in a horizontal direction and N displays in a vertical direction (M and N are integers), the image-size setting unit 201 generates screens with the size reduced to 1/M in the horizontal direction and 1/N in the vertical direction. In the case of a single display configuration, the image-size setting unit 201 outputs the input video signal without changing the image size.

The recording unit 202 compresses and encodes the video signal, with the size reduced by the image-size setting unit 201, to generate a motion picture file. Furthermore at this time, the recording unit 202 generates the motion picture file, including the position information relating to the arrangement positions of the respective display devices in the multi-display, and the time code for synchronizing the respective displays. In this example, the recording unit 202 generates the motion picture file further including the information of the backlight 13. The recording unit 202 then records the motion picture file on a recording medium 205. As the recording medium 205, any medium may be used such as a HDD (Hard Disk Drive), a SSD (Solid State Disk), a flash memory card, or the like.

The reproduction unit 203 reproduces the motion picture file recorded on the recording medium 205, and decodes and outputs the video signal. A reproduction position of the motion picture file can be synchronized in units of hours, minutes, seconds, and frame, by comparing the time code recorded in the motion picture file with the input time code. Furthermore the reproduction unit 203 reproduces the position information relating to the arrangement positions of the respective display devices in the multi-display, and the backlight information from the reproduced motion picture file, to output them.

In this way, the display device according to the present exemplary embodiment includes the video recording and reproduction unit 17 that records the video signal to be displayed on the liquid crystal panel 12. As a result, it can be confirmed whether the desired advertising contents have been displayed at a time according to the schedule.

Moreover, in the present exemplary embodiment, when one large screen is formed by a plurality of display devices, the size of a video screen to be recorded in the video recording and reproduction unit 17 is reduced according to the number of displays to be used for the multi-display, and the video screen is recorded. Together with this, the position information relating to the arrangement positions of the respective display devices in the multi-display, and the time code for synchronizing the respective displays are recorded in the video recording and reproduction unit 17. As a result, by synthesizing the video signals reproduced by the video recording and reproduction unit 17 of the respective display devices constituting the multi-display, large-screen video pictures formed by the multi-display configuration can be displayed on one display device, and it can be confirmed whether the advertising contents have been displayed according to the schedule.

That is to say, it is assumed here that the display device 1 as shown in FIG. 3 is used as the display devices 101*a* to 101*d* in the digital signage system as shown in FIG. 1. As described above, the digital signage system as shown in FIG. 1 uses the multi-display configuration in which the four display devices 101*a* to 101*d* form one large screen.

In this way, when the four display devices 101*a* to 101*d* form one large screen, a video screen to be recorded in each of the video recording and reproduction units 17*a* to 17*d* (refer to FIG. 6) of the respective display devices 101*a* to 101*d* is reduced in image size, as shown in FIG. 5 (A) to FIG. 5 (D), to ½ in the horizontal direction and ½ in the vertical direction. Then, position information indicating an upper left position is recorded in the video recording and reproduction unit 17*a* of the display device 101*a* arranged at the upper left position. Position information indicating a lower left position is recorded in the video recording and reproduction unit 17*b* of the display device 101*b* arranged at the lower left position. Position information indicating an upper right position is recorded in the video recording and reproduction unit 17*c* of the display device 101*c* arranged at the upper right position. Position information indicating a lower right position is recorded in the video recording and reproduction unit 17*d* of the display device 101*d* arranged at the lower right position. Furthermore a common time code including hours, minutes, seconds, and frame is recorded in the video recording and reproduction units 17*a* to 17*d* of the respective display devices 101*a* to 101*d*.

Figure 6:
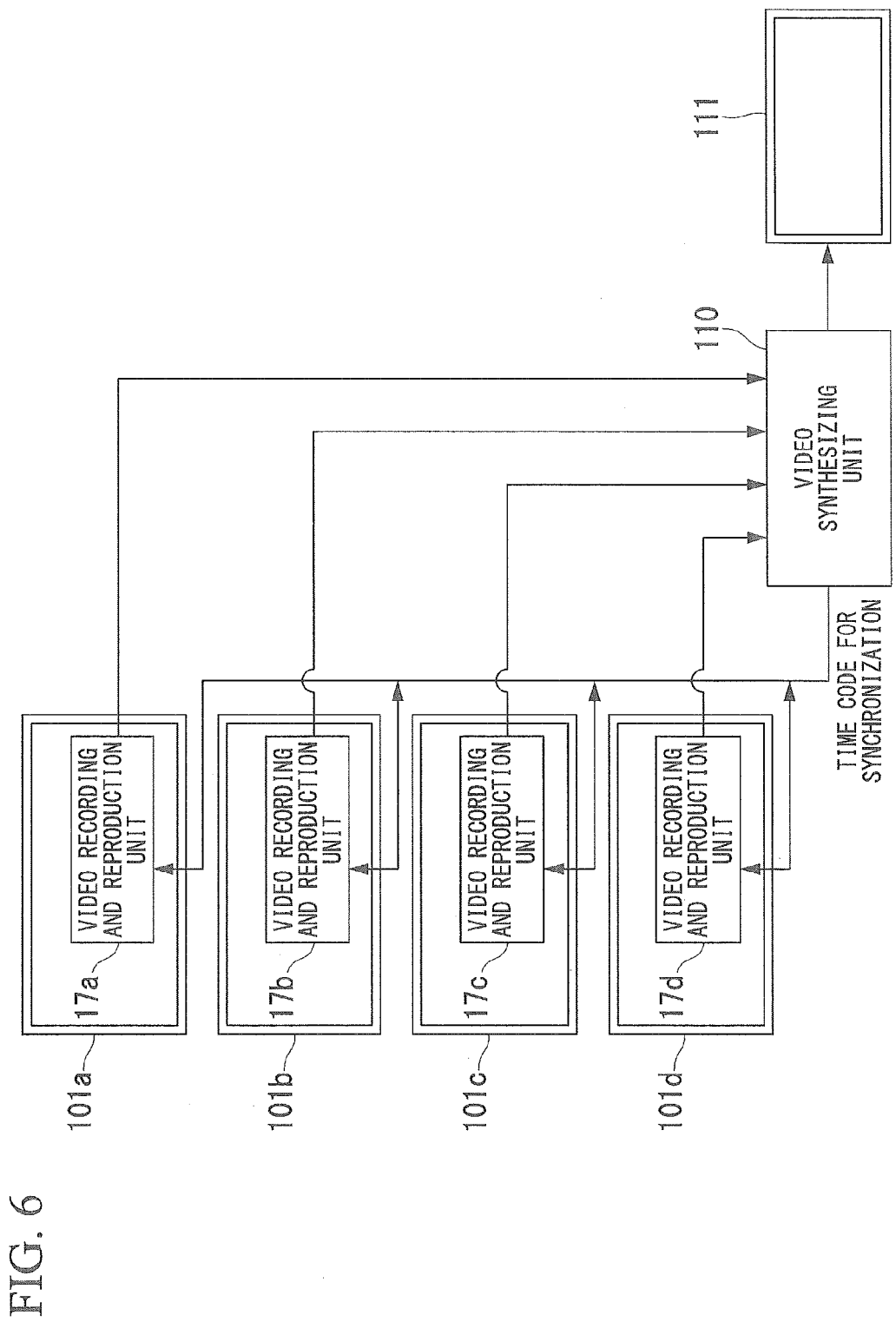
FIG. 6 is a block diagram to be used for explanation when confirmation of actual display performance is performed by using a signal recorded in the video recording and reproduction unit.

When confirming whether the advertising contents are displayed according to the schedule, then as shown in FIG. 6, outputs of the video recording and reproduction units 17*a* to 17*d* of the respective display devices 101*a* to 101*d*, and inputs of a video synthesizing device 110 are connected. Moreover, a time code for synchronization is transmitted from the video synthesizing device 110 to the video recording and reproduction units 17*a* to 17*d* of the respective display devices 101*a* to 101*d*.

As a result, the video signal as shown in FIG. 5 (A) is reproduced by the video recording and reproduction unit 17*a* of the display device 101*a*. Furthermore the video signal as shown in FIG. 5 (B) is reproduced by the video recording and reproduction unit 17*b* of the display device 101*b*. The video signal as shown in FIG. 5 (C) is reproduced by the video recording and reproduction unit 17*c* of the display device 101*c*. Moreover, the video signal as shown in FIG. 5 (D) is reproduced by the video recording and reproduction unit 17*d* of the display device 101*d*. The video signals reproduced by the video recording and reproduction units 17*a* to 17*d* of the respective display devices 101*a* to 101*d* are synchronized by the time code from the video synthesizing device 110. Furthermore at this time, the video recording and reproduction units 17*a* to 17*d* of the respective display devices 101*a* to 101*d* reproduce the position information relating to the arrangement positions of the respective display devices 101*a* to 101*d* in the multi-display.

The video synthesizing device 110 synthesizes the video signals reproduced by the video recording and reproduction units 17*a* to 17*b* of the respective display devices 101*a* to 101*d*, based on the position information relating to the arrangement positions, and outputs it to the display device 111. That is to say, the video synthesizing device 110 synthesizes the reproduced video signal from the video recording and reproduction unit 17*a* of the display device 101*a* on the upper left on the screen based on the position information, synthesizes the reproduced video signal from the video recording and reproduction unit 17*b* of the display device 101*b* on the lower left on the screen based on the position information, synthesizes the reproduced video signal from the video recording and reproduction unit 17*c* of the display device 101*c* on the upper right on the screen based on the position information, and synthesizes the reproduced video signal from the video recording and reproduction unit 17*d* of the display device 101*d* on the lower right on the screen based on the position information. As a result, a monitor screen as shown in FIG. 5 (E) is displayed on the display device 111. By means of this monitor screen of the display device 111, it can be confirmed whether the advertising contents have been displayed according to the schedule.

In the above-described example, the video synthesizing device 110 and the display device 111 are prepared in order to confirm whether the advertising contents are displayed according to the schedule. If the display device 101*a* also has the function of the video synthesizing device 110, the video synthesizing device 110 need not be prepared. Moreover, if the display device 101*a* itself is used as the display device 111 that displays the monitor screen, the display device 111 for monitoring need not be prepared.

As described above, according to the exemplary embodiment of the present invention, the video recording and reproduction unit 17 that records the video signal to be displayed on the liquid crystal panel 12 is provided. As a result, it can be confirmed whether the desired advertising contents have been displayed at a time according to the schedule.

Moreover, in the present exemplary embodiment, when one large screen is formed by a plurality of display devices, the size of the video screen to be recorded in the video recording and reproduction unit 17 is reduced according to the number of displays to be used for the multi-display, and the video screen is recorded. Together with this, the position information relating to the arrangement positions of the respective display devices in the multi-display, and the time code for synchronizing the respective displays are recorded in the video recording and reproduction units 17*a* to 17*d*. As a result, the large-screen video picture formed by the multi-display configuration can be displayed on one display device, and it can be confirmed whether the advertising contents have been displayed according to the schedule.

In the video recording and reproduction unit 17, all of the video signals to be displayed on the liquid crystal panel 12 may be recorded, or the video signals may be recorded for every predetermined interval. Moreover, the video signal to be displayed on the liquid crystal panel 12 may be selected at random and recorded. Furthermore, it may be recorded by combining the predetermined interval and a random interval.

The exemplary embodiments of the present invention have been described above in detail with reference to the drawings. However, the specific configuration is not limited to the exemplary embodiments, and also includes design changes and the like within a range that does not depart from the scope of the present invention.

A part or all of the above-described embodiments may be described as in the following notes, but is not limited thereto.

(Supplementary Note 1)

A display device including: a display panel that displays an input video signal; and a video recording and reproduction unit that records and reproduces a video picture to be displayed on the display panel, wherein the video recording and reproduction unit includes an image-size setting unit that reduces a size of a screen of the input video signal according to a multi-display configuration.

(Supplementary Note 2)

The display device according to supplementary note 1, wherein in a case of multi-display in a two-dimensional array of M in a horizontal direction by N in a vertical direction (M and N are integers), the image-size setting unit generates a size-reduced screen of 1/M in the horizontal direction and 1/N in the vertical direction.

(Supplementary Note 3)

The display device according to supplementary note 1 or 2, wherein the video recording and reproduction unit further records position information of a multi-display screen configuration.

(Supplementary Note 4)

The display device according to any one of supplementary notes 1 to 3, wherein the video recording and reproduction unit further records a signal for synchronization.

REFERENCE SYMBOLS 1, 101a to 101b Display device
11 Video processing unit
12 Liquid crystal panel
15 Control unit
17, 17a to 17d Video recording and reproduction unit
102 Player
103 Content server

The invention claimed is:

1. A display device that constitutes multi-display along with at least one separate display unit, the display device comprising:
   a video processing unit that supplies an output video signal generated by processing an input video signal;
   a display panel that receives the output video signal and displays a video picture using the output video signal; and
   a video recording and reproduction unit that receives a signal that is a same as the output video signal received by the display panel and includes the video picture displayed by the display panel, the video recording and reproduction unit recording a video signal for a size-reduced screen generated by reducing a size of the received signal that is the same as the output video signal according to a multi-display configuration, and the video recording and reproduction unit outputting the video signal for the size-reduced screen to a video synthesizing device that synthesizes, based on position information, the video signal for the size-reduced screen with a video signal for a size-reduced screen generated by the at least one separate display device, the position information relating to arrangement positions of the display device and the at least one separate display device in the multi-display.

2. The display device according to claim 1, wherein, in a case of multi-display in a two-dimensional array of M in a horizontal direction by N in a vertical direction (M and N are integers), the video recording and reproduction unit generates a size-reduced screen of 1/M in the horizontal direction and 1/N in the vertical direction.

3. The display device according to claim 1, wherein the video recording and reproduction unit further records the position information relating to the arrangement position of the display device in the multi-display.

4. The display device according to claim 1, wherein the video recording and reproduction unit further records a signal for synchronization.

5. The display device according to claim 1, wherein the video signal for the size-reduced screen shows an entirety of the video picture.

6. The display device according to claim 1, wherein the video recording and reproduction unit reduces a size of the size-reduced screen according to a number of displays to be used for the multi-display configuration.

7. The display device according to claim 1, wherein the video recording and reproduction unit records the position information relating to the arrangement position of the display device in the multi-display and a time code for synchronizing respective displays.

8. The display device according to claim 7, further comprising:
   a backlight that irradiates light to the display panel,
   wherein the video recording and reproduction unit records an operating state of the backlight simultaneously with recording the position information relating to the arrangement position of the display device in the multi-display and the time code.

9. The display device according to claim 1, further comprising:
   a backlight that irradiates light to the display panel,
   wherein the video recording and reproduction unit records an operating state of the backlight simultaneously.

10. A display method for a display device constituting multi-display along with at least one separate display unit, the display method comprising:
    supplying an output video signal generated by processing an input video signal;
    receiving, by a display panel of the display device, the output video signal;
    displaying, by the display panel, a video picture using the output video signal;
    receiving, by a video recording and reproduction unit of the display device, a signal that is a same as the output video signal received by the display panel and includes the video picture displayed by the display panel;
    recording, by the video recording and reproduction unit, a video signal for a size-reduced screen generated by reducing a size of the received signal that is the same as the output video signal according to a multi-display configuration; and outputting the video signal for the size-reduced screen to a video synthesizing device that synthesizes, based on position information, the video signal for the size-reduced screen with another video signal for a size-reduced screen generated by the at least one separate display device, the position information relating to arrangement positions of the display device and the at least one separate display device in the multi-display.

11. The display method according to claim 10, wherein the video signal for the size-reduced screen shows an entirety of the video picture.

12. The display method according to claim 10, wherein the reducing a size of the received video signal includes reducing a size of the size-reduced screen according to a number of displays to be used for the multi-display configuration.

13. The display method according to claim 10, further comprising:
    recording the position information relating to the arrangement position of the display device in the multi-display and a time code for synchronizing respective displays.

14. The display method according to claim 13, further comprising:
    irradiating, by a backlight, light to the display panel,
    wherein the video recording and reproduction unit records an operating state of the backlight simultaneously with recording the position information relating to the arrangement position of the display device and the time code.

15. The display method according to claim 10, further comprising:
    irradiating, by a backlight, light to the display panel; and
    recording an operating state of the backlight.

16. The display device according to claim 1, wherein the video recording and reproduction unit randomly selects the video signal for the size-reduced screen, and records the randomly selected video signal.

17. The display device according to claim 1, wherein a video picture of the recorded video signal includes one of video pictures generated by dividing a video picture of the input video signal according to the multi-display configuration.

18. The display method according to claim 13, further comprising:
    synthesizing, based on the position information relating to the arrangement position and the time code, video signals reproduced by the display devices to generate a synthesized signal; and
    displaying a video picture using the synthesized signal.

19. The display device according to claim 1, wherein, when a plurality of display devices form one screen, the video recording and reproduction unit reduces a size of the size-reduced screen according to a number of displays to be used for the multi-display configuration and records the size-reduced screen.

20. The display device according to claim 1, wherein the video synthesizing device transmits a time code to the video recording and reproduction unit for synthesizing the video signal for the size-reduced screen with the video signal for the size-reduced screen generated by the at least one separate display device.

21. The display device according to claim 1, wherein the output video signal comprises a video signal processed based on the position information relating to the arrangement position of the display device in the multi-display so as to form one screen by the multi-display.

22. The display device according to claim 1, wherein the signal received by the video recording and reproduction unit is supplied from the video processing unit.

* * * * *